Figure 1:
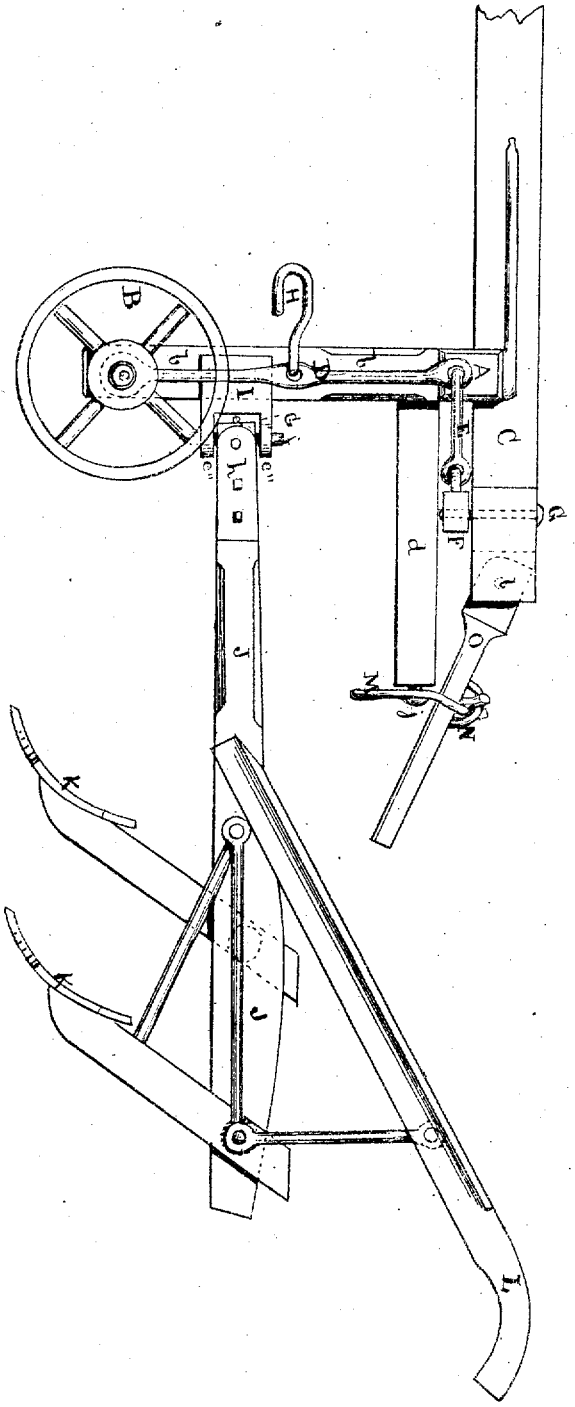

WILLIAM S. WEIR JR'S.
CULTIVATOR

2 Sheets Sheet 1.

4489

REISSUED JUL 25 1871

Witnesses
Thos. W. Cridland
Walter Ogilvie

William S. Weir Jr
by A. McCallum & W. B. Richard
Attys

AM. PHOTO-LITHOGRAPHIC CO. N.Y. (OSBORNE'S PROCESS.)

William S. Weir Jr's Cultivator
4489
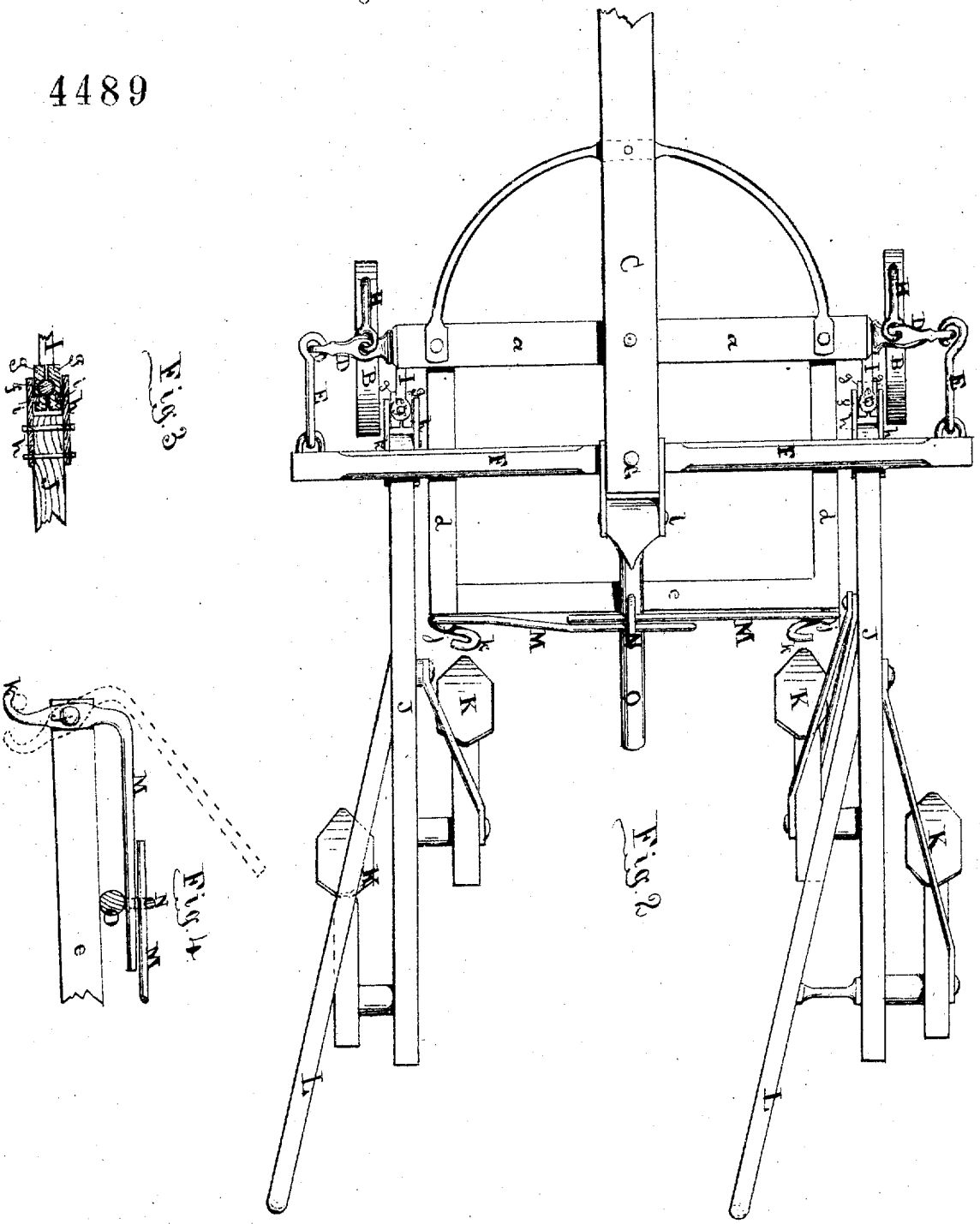
Witnesses
Thos. W. Cridler
Walter Ogilvie
William S. Weir Jr
per A. McCallum & W. H. Richards
Attys.
AM. PHOTO-LITHOGRAPHIC CO. N.Y. (OSBORNE'S PROCESS.)

UNITED STATES PATENT OFFICE.

WILLIAM S. WEIR, JR., OF MONMOUTH, ILLINOIS.

IMPROVEMENT IN CULTIVATORS.

Specification forming part of Letters Patent No. 46,285, dated February 7, 1865; reissue No. 4,489, dated July 25, 1871.

*To all whom it may concern:*

Be it known that I, WILLIAM S. WEIR, Jr., of Monmouth, in the county of Warren and State of Illinois, have invented certain Improvements in Cultivators, of which the following is a specification:

My invention relates to improvements in that class of cultivators known as "straddle-row cultivators;" and the invention consists: First, in providing an improved device by means of which the draft of the horses is more effectually equalized, and applied to the machine in such manner as to insure a more steady and equal drag on both sides, and to obviate undue strain upon the axle or truck-frame of the machine. Secondly, it also consists in providing an improved device for hinging the plow-beams to the axle or main frame of the cultivator, so as to permit of their being moved independently and freely in a vertical or lateral direction, and which retains the plow-beams with their standards and plows in an upright position during operation without other connection or support. Thirdly, it further consists in an improved device for sustaining the plow-beams and their plows in an elevated position clear above the ground when not in use, and for lowering them again to the ground when desired.

In the accompanying drawing, Figure 1 is a side view of my improved machine; Fig. 2, a plan or top view of the same; Fig. 3, a horizontal section of a portion of the same taken on the line *x x*, Fig. 1; Fig. 4, a section of a portion of the same taken on the line *z z*, Fig. 2.

A represents the axle or truck-frame of the machine, composed of an elevated cross-bar, *a*, and two vertical side bars, *b*, from the lower ends of which short axles or spindles, *c*, project outwardly to receive the supporting-wheels B. To the upper ends of the vertical bars *b* are secured rearwardly-projecting bars *d*, the rear ends of which are connected by a cross-bar, *e*. C represents the draft-pole secured to the center of the cross-bar *a*; its rear end projects some distance in rear of truck-frame. F is a cross-bar pivoted at its center to the rear portion of the draft-pole by a bolt, G; it is longer than the cross-bar *a* of the truck-frame and its ends project on each side beyond the wheels B. D D are two rods or bars, the lower ends of which are fitted loosely around the axles *c* between the wheels and the vertical bars *b*. The upper ends of these rods or bars are also loosely linked or shackled to the ends of the pivoted bar F by links E E. Hooks H are linked to the bars or rods D for the purpose of attaching thereto the draft. I I represent two plates or brackets secured one to each of the vertical bars *b* of the axle. These plates are made with a rectangular slot or opening, *e'*, and may be constructed out of a piece of metal having the upper and lower rear projecting ends or ears pierced with vertical bolt-holes or folded or bent in such manner as to form eyes *e''*. J J represent the plow-beams, the forward ends of which are each provided with two plates, *h h*, secured to opposite sides of the beam; they project beyond the beam and are provided on their inner faces with projecting studs or pivots *i i*, as shown in Fig. 3. *g g* are two metal blocks, loosely fitted around a journal, *f*, and having holes formed in their outer faces to receive the studs or pivots *i i*, which are inserted therein. The pin or journal *f* passes through and between the blocks *g g*, and, being of greater diameter than the grooves in the blocks, the latter are kept slightly apart. The ends of the journals *f* are pivoted in the eyes or ears *e''* of the plates or brackets I of the vertical bars *b*, and thus hinge the plow-beams to the axle. K represents the shovels or plows secured to standards attached to the plow-beams in the usual way, and the beams are provided with handles L, whereby the operator directs the movement of the plows. To the rear end of each of the bars *d* is pivoted, by a bolt, *j*, a curved rod, M, the lower end of which is formed into a hook, *k*. (See Figs. 2 and 4.) The upper parts of these rods M are made straight and are passed through a loop or eye, N, secured on a lever, O, the forward end of which is pivoted, by a bolt, *l*, between two plates secured to the rear end of the draft-pole C.

The machine is operated in the usual manner peculiar to implements of similar general construction.

The advantages resulting from the use of my improved devices are as follows: It will be seen that the lower ends of the evener device are suspended or loosely hinged to the lower ends of the axle or truck-frame and the upper ends to the cross-bar pivoted to the rear portions of the tongue. The pivotal points of the evener are therefore above and below and independent of the truck-frame proper, while the draft is attached, not to the uprights of the frame, but, independent thereof, to the evener, at a point nearly in a line with the points of resistance of the plow-beams. It is therefore obvious that the drag of the machine must be equally distributed and no uneven or undue strain comes upon any one portion of the frame, and thereby the frame is rendered not only more durable, but is also kept in its proper position, with the vertical uprights in a vertical position—a matter of great importance when considered with the fact that upon the vertical position of these uprights depends the vertical position of the plow-beams, and, consequently, of the steady and level working of the gangs of plows, a desideratum unattainable where the frame is dragged or twisted out of shape through the evener being secured or pivoted directly to the uprights of the axle, as in all such devices heretofore in use. This arrangement of the evener also brings the hitching-point in a line with the draft from the horses' shoulders to the shovels, thereby relieving the necks and shoulders of the animals from undue pressure, and this without materially diminishing the length of the vibration of the evener. The plates *h h*, blocks *g g*, and journal *f*, which comprise the device for hinging the plow-beams to the uprights of the axle, are peculiarly adapted to meet the requirements of such a joint. It will be seen that the studs or pivots of the plates *h*, inserted in the recesses in the blocks *g*, permit of the plow-beams being moved freely up or down with the least possible friction and without moving the other parts of the joint; while the blocks *g g*, being inclosed between the plates *h h* and pivoted around the journal *f*, permit of the plow-beams being moved freely from side to side; and, through the diameter of the journal *f* being greater than the grooves in the blocks, all unnecessary play, consequent on the wearing of the latter, can be avoided by screwing up the bolts which secure the plates to the beams. It will also be seen that these joint-pieces retain the plow-beams in an upright position without the aid of any other connection or support.

The advantages arising from the use of the peculiar device for sustaining the plow-beams clear above the ground when not in use, and for lowering them again when necessary, are deemed sufficiently obvious without further particularization.

What I claim as my invention is—

1. The cross-bar F, when pivoted to the draft-pole of a walking straddle-row cultivator in rear of the axle or truck-frame, and connected with the draft in manner substantially as and for the purpose set forth.

2. The plates *h h* secured to the forward ends of the plow-beams, and blocks *g g* and journals *f*, constructed and operating substantially as described, for the purpose of hinging or pivoting the plow-beams to the axle by brackets I or their equivalent, as set forth.

3. The pivoted rods M having the hooked ends *k*, in combination with the bars *d d*, levers O, and draft-pole C, substantially as and for the purpose set forth.

WILLIAM S. WEIR, JR.

Witnesses:

WILLIAM B. BOYD,
ALMON KIDDER.